US012479964B2

United States Patent
Tartamella et al.

(10) Patent No.: US 12,479,964 B2
(45) Date of Patent: Nov. 25, 2025

(54) SYSTEM AND METHOD FOR POLYMER SYNTHESIS, RUBBER FORMULATION, AND CHARACTERIZATION

(71) Applicants: Bridgestone Corporation, Tokyo (JP); Timothy L. Tartamella, Boston Heights, OH (US); William Franks, Canal Fulton, OH (US); Bret Chisholm, North Canton, OH (US); Mindaugas Rackaitis, Hudson, OH (US)

(72) Inventors: Timothy L. Tartamella, Boston Heights, OH (US); Bret Chisholm, North Canton, OH (US); Mindaugas Rackaitis, Hudson, OH (US)

(73) Assignee: Bridgestone Corporation, Chuo-ku (JP)

( * ) Notice: Subject to any disclaimer, the term of this patent is extended or adjusted under 35 U.S.C. 154(b) by 722 days.

(21) Appl. No.: 17/767,225

(22) PCT Filed: Oct. 8, 2020

(86) PCT No.: PCT/US2020/054841
§ 371 (c)(1),
(2) Date: Apr. 7, 2022

(87) PCT Pub. No.: WO2021/072119
PCT Pub. Date: Apr. 15, 2021

(65) Prior Publication Data
US 2022/0372235 A1 Nov. 24, 2022

Related U.S. Application Data

(60) Provisional application No. 62/912,361, filed on Oct. 8, 2019, provisional application No. 62/912,381, filed (Continued)

(51) Int. Cl.
*C08J 3/205* (2006.01)
*C08J 3/20* (2006.01)
*G01N 33/52* (2006.01)

(52) U.S. Cl.
CPC .............. *C08J 3/2053* (2013.01); *C08J 3/203* (2013.01); *G01N 33/52* (2013.01); *C08J 2309/06* (2013.01); *C08J 2347/00* (2013.01)

(58) Field of Classification Search
None
See application file for complete search history.

(56) References Cited

U.S. PATENT DOCUMENTS 6,265,226 B1 * 7/2001 Petro .................... B01J 19/0046
422/63
6,855,791 B2 2/2005 Van Doren et al.
(Continued)

OTHER PUBLICATIONS

International Search Report and Written Opinion for corresponding PCT/US2020/054841 dated Jan. 27, 2021 (14 pp).

*Primary Examiner* — Satya B Sastri
(74) *Attorney, Agent, or Firm* — Meredith E. Hooker; Arthur M. Reginelli

(57) ABSTRACT

A method for rubber formulating and characterizing, the method comprising (i) providing a plurality of rubber samples including at least three rubber samples each contained within a container; (ii) introducing a compounding additive to at least one of the samples within the plurality of rubber samples to thereby form a plurality of rubber formulations each contained within a container; (iii) mixing at least one of the samples of the plurality of rubber formulations under high-shear conditions to thereby form a plurality of vulcanizable compositions; and (iv) analyzing at least one of the samples plurality of vulcanizable compositions to thereby characterize the compositions of the plurality, where at least one or the plurality of the rubber samples, the
(Continued)

plurality of rubber formulations, the plurality of vulcanizable compositions are transferred to a subsequent step through an automated transfer.

13 Claims, 3 Drawing Sheets

Related U.S. Application Data on Oct. 8, 2019, provisional application No. 62/912,447, filed on Oct. 8, 2019.

(56) References Cited

U.S. PATENT DOCUMENTS

| | | | |
|---|---|---|---|
| 2002/0070469 A1* | 6/2002 | Hiatt | B29C 39/44 |
| | | | 700/197 |
| 2005/0179156 A1* | 8/2005 | Carlson | B01F 33/813 |
| | | | 264/349 |
| 2005/0188770 A1 | 9/2005 | Mazilu | |
| 2005/0197789 A1 | 9/2005 | Niermann et al. | |
| 2007/0244264 A1 | 10/2007 | Granger et al. | |
| 2014/0051791 A1* | 2/2014 | Horie | C08K 5/31 |
| | | | 524/492 |

* cited by examiner

SYSTEM AND METHOD FOR POLYMER SYNTHESIS, RUBBER FORMULATION, AND CHARACTERIZATION

This application is a National-Stage application of PCT/US2020/054841 filed on Oct. 8, 2020, which claims the benefit of U.S. provisional application No. 62/912,447 filed on Oct. 8, 2019, U.S. provisional application No. 62/912,361 filed on Oct. 8, 2019, and U.S. provisional application No. 62/912,381 filed on Oct. 8, 2019, which are incorporated herein by reference.

FIELD OF THE INVENTION

Embodiments of the invention provide a system and related methods for polymer synthesis, rubber formulation, and characterization.

BACKGROUND OF THE INVENTION

The use of combinatorial techniques to generate libraries of fluid, chemical and/or biological compounds is known in the art. Once these libraries are generated, it is desirable to screen or characterize the compounds to determine if the desired properties are present, such as physical and/or chemical properties. Most techniques developed for screening and characterization of combinatorial libraries are sequential, which involve sample preparation or sample transfer steps, which are generally labor-intensive, time-consuming, and expensive for large libraries or arrays of several compounds. Most current techniques are also problematic in that relatively large quantities of material are needed, which is wasteful. This approach necessitates a review of only the most promising samples and ignores obscure variations that might lead to unexpected, but worthwhile compounds.

The development and optimization of rubber polymer and rubber compounds is desirable in many industries such as the tire industry. The use of combinatorial techniques have nonetheless been hindered by several factors. Accordingly, there is a need in the art to develop devices and processes to process a large number of relatively small samples.

SUMMARY OF THE INVENTION

One or more embodiments of the present invention provide a method for rubber formulating and characterizing, the method comprising (i) providing a plurality of rubber samples including at least three rubber samples each contained within a container; (ii) introducing a compounding additive to at least one of the samples within the plurality of rubber samples to thereby form a plurality of rubber formulations each contained within a container; (iii) mixing at least one of the samples of the plurality of rubber formulations under high-shear conditions to thereby form a plurality of vulcanizable compositions; and (iv) analyzing at least one of the plurality of vulcanizable compositions to thereby characterize the compositions of the plurality, where at least one of the plurality of the rubber samples, the plurality of rubber formulations, the plurality of vulcanizable compositions are transferred to a subsequent step through an automated transfer.

Yet other embodiments of the present invention provide a system comprising (i) a polymer synthesis machine; (ii) one or more analytical tester adapted to analyze polymer synthesized in said synthesis machine; (iii) a rubber formulation machine; (iv) a mixer; and (v) rubber analyzer.

Still other embodiments of the present invention provide a method for optimizing preparation and selection of polymer samples for further evaluation, comprising (i) synthesizing polymer in solution to form a polymer cement sample; (ii) extracting a subsample from said polymer cement sample; (iii) determining from said subsample the amount of polymer within the polymer cement sample; (iv) providing a generic rubber compound recipe including a plurality of ingredients to be combined with rubber, where the recipe quantifies the amount of each ingredient as a function of the total weight of rubber within the recipe; (v) creating a specific recipe for the polymer cement sample by correlating the amount of polymer within the polymer cement sample to the generic rubber compound recipe; and (vi) introducing the plurality of ingredients to the polymer cement sample according to the specific recipe.

Other embodiments of the present invention provide a method for coordinating polymer isolation and mixing to optimize preparation and selection of polymer samples for further evaluation, comprising (i) preparing a cement comprising predetermined quantities of monomer, catalyst, and solvent; (ii) testing a portion of said cement to determine a polymer weight conversion percentage of said cement; (iii) adding other ingredients to another portion of said cement based on said polymer weight conversion percentage to form a liquid mix; and (iv) mixing and testing said liquid mix to determine performance characteristics thereof.

Still yet other embodiments of the present invention provide a method for isolating and mixing a large number of polymer samples for testing and evaluation, comprising (i) preparing a plurality of different polymer samples in a polymer synthesis machine; (ii) separating each said different polymer sample into a structure sample and a performance sample; (iii) transferring said structure sample to an analytic tester which generates analytic test data of each said polymer sample; (iv) combining a pre-mix of selected ingredients with said performance sample; (v) mixing said pre-mix and said performance sample in at least one mixer into a mixed sample; (vi) forming said mixed sample; (vii) testing said mixed sample in a performance test device and generating performance data of each said mixed sample; and (viii) receiving and correlating analytic test data for each said polymer sample with performance data of each said mixed sample in a database.

DETAILED DESCRIPTION OF ILLUSTRATIVE EMBODIMENTS

Embodiments of the invention are based, at least in part, on the discovery of a system and related methods for rubber formulating and characterization. The invention advantageously takes advantage of the preparation of a large number of relatively small samples in conjunction with sample processing and characterization equipment adapted for these small samples. Advantageously, the system and methods provide the tools and mechanisms to formulate the relatively small samples of elastomer into vulcanizable compositions that can be subsequently cured and characterized to yield data and information that can be used predict performance of the particular elastomer and/or rubber formulation when synthesized or prepared on a larger scale (e.g. in the manufacture of rubber goods such as tires).

Overview of Process

Figure 1:
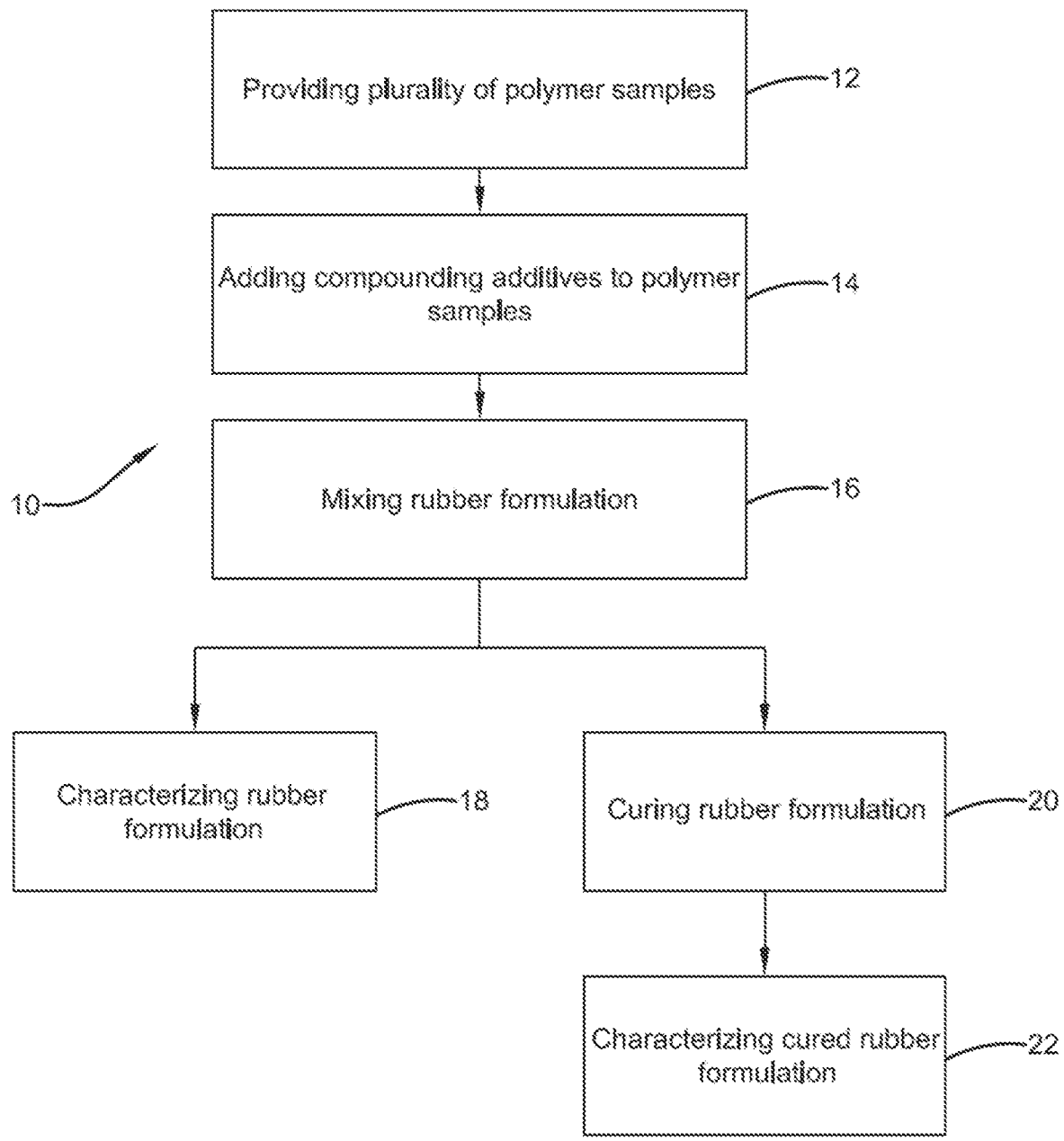
FIG. 1 is a flow chart showing a process of one or more embodiments of the invention.

An overview of the process of the present invention can be described with reference to FIG. 1, which shows process 10 including a step 12 of providing a plurality of polymer samples, followed by a step 14 of adding compounding additives to the plurality of polymer samples to thereby form a plurality of rubber formulations, and then followed by a step 16 of mixing the rubber formulations to form a plurality of mixed rubber formulation. In one or more embodiments, the plurality of mixed rubber formulations is directly characterized in a step 18 of characterizing the rubber formulation. In other embodiments, the plurality of mixed rubber formulations is cured in a step 20 of curing the rubber formulation to thereby form a plurality of cured rubber samples, which is then followed by a step 22 of characterizing the plurality of cured rubber samples.

Figure 2:
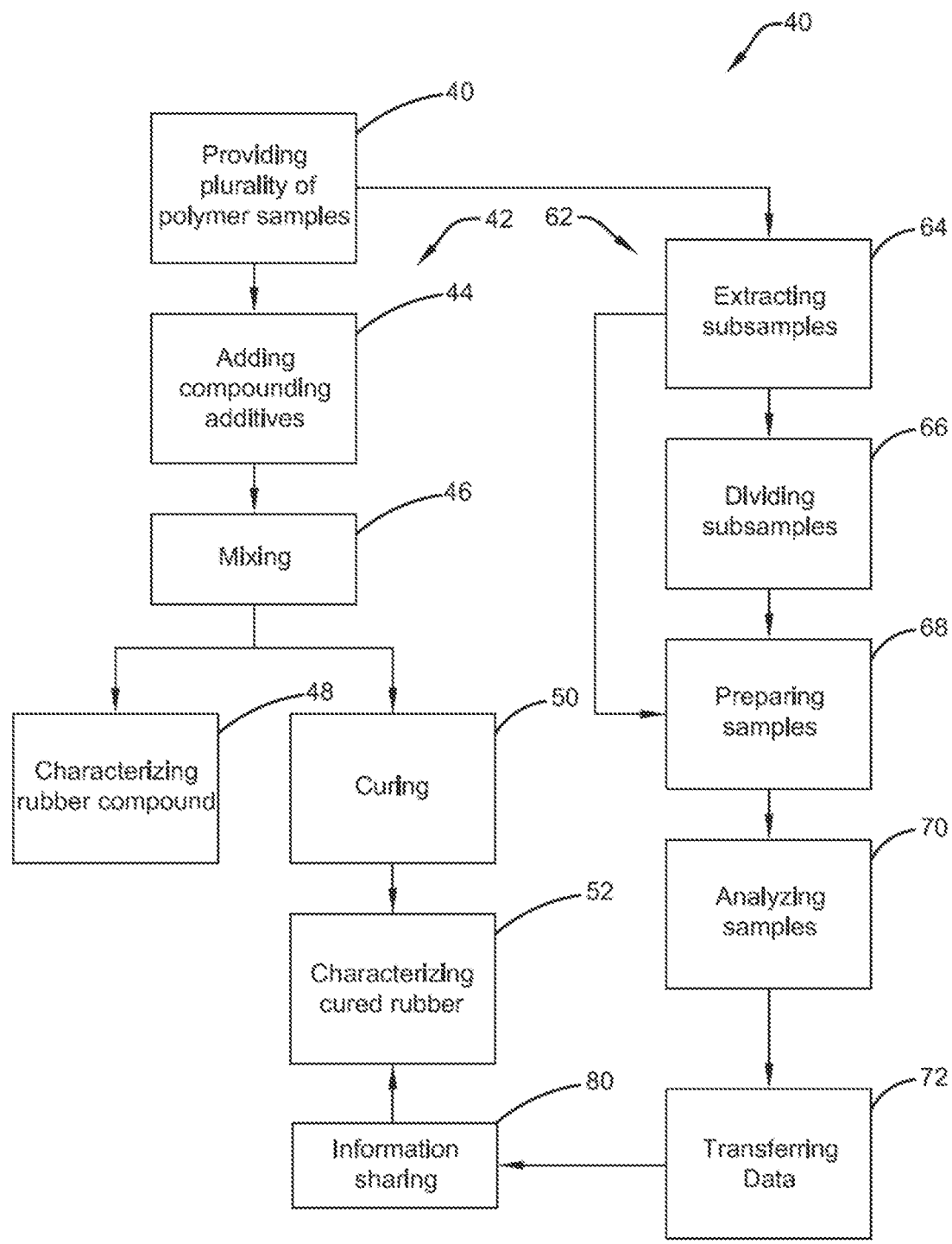
FIG. 2 is a flow chart showing a process of one or more embodiments of the invention.

Embodiments of the invention can also be described with reference to FIG. 2, which shows process 40 including parallel paths 42 and 62 extending from an initial step 40 of providing a plurality of polymer samples. Path 42, which may also be referred to as rubber formulation and characterization path 42, is similar to those embodiments described with reference to FIG. 1 and includes a step 44 of adding compounding additives to the plurality of polymer samples to thereby form a plurality of rubber formulations, and then followed by a step 46 of mixing the rubber formulations to form a plurality of mixed rubber formulation. In one or more embodiments, the plurality of mixed rubber formulations is directly characterized in a step 48 of characterizing the rubber formulation. In other embodiments, the plurality of mixed rubber formulations is cured in a step 50 of curing the rubber formulation to thereby form a plurality of cured rubber samples, which is then followed by a step 52 of characterizing the plurality of cured rubber samples.

Path 62, which may be referred to as polymer characterization path 62, includes a step 64 of extracting a subsample from one or more of the plurality of polymer samples to thereby form a plurality of subsamples, optional step 66 of dividing the subsample to thereby form a plurality of divided subsamples, optional step 68 of preparing the subsamples or divided subsamples for analysis, a step 70 of analyzing the subsamples or divided subsamples, and a step 72 of transferring data obtained from said step of analyzing to a data storage and/or processing unit.

Providing Polymer Samples

In one or more embodiments, the polymer samples that are provided in steps 12 and/or 40 include vulcanizable polymer, which may also be referred to as rubber, elastomer, or elastomeric polymer. The skilled person readily understands that vulcanizable polymer refers to polymer that can be subjected to vulcanization, for example heat and crosslinking the presence of a curative such as sulfur, to produce a vulcanizate.

Exemplary vulcanizable polymers that are useful in the practice of the present invention, which may also be referred to as elastomeric polymers, include polydienes and polydiene copolymers. Specific examples of these polymer include, but are not limited to, polybutadiene, poly(styrene-co-butadiene), polyisoprene, poly(styrene-co-isoprene), and functionalized derivatives thereof. Other polymers that may be included in the polymer sample include neoprene, poly (ethylene-co-propylene), poly(styrene-co-butadiene), poly (ethylene-co-propylene-co-diene), polysulfide rubber, acrylic rubber, urethane rubber, silicone rubber, epichlorohydrin rubber, syndiotactic polybutadiene, and mixtures thereof or with polydienes and polydiene copolymers. These elastomers can have a myriad of macromolecular structures including linear, branched, and star-shaped structures. These elastomers may also include one or more functional units, which typically include heteroatoms tethered to the backbone of the polymer.

In one or more embodiments, the polymer samples are provided as a solid. In other embodiments, the polymer samples are provided as solute (i.e. dissolved) or dispersion within a solvent. In particular embodiments, the polymer samples are provided as a polymer cement that results from the solution synthesis of the vulcanizable polymer. Accordingly, certain embodiments may include weighing and providing dry or solvent-swollen swollen polymer samples. Other embodiments may include obtaining a dry or solvent swollen polymer, and dissolving or otherwise dispersing the polymer within a solvent. Yet other embodiments may include synthesizing a polymer within a solvent to provide a polymer cement. Still other embodiments may include synthesizing a polymer within an emulsion to provide a polymer emulsion.

In one or more embodiments, the polymer samples are provided in a container. In one or more embodiments, the container may include any apparatus configured or otherwise adapted to hold the samples. In one or more embodiments, the containers may include bottles, vials, flasks, ampuls, and wells. In one or more embodiments, the containers include vessels, which may be referred to as liners, in which the polymer is synthesized.

According to aspects of the present invention, the plurality of polymer samples may each individually include less than 120 grams, in other embodiments less than 50 grams, in other embodiments less than 30 grams, in other embodiments less than 20 grams, and in other embodiments less than 15 grams of polymer. In one or more embodiments, each polymer sample includes from about 0.5 to about 120 grams, in other embodiments from about 0.5 to about 30 grams, in other embodiments from about 1 to about 20 grams, and in other embodiments from about 2 to about 10 grams of polymer.

In those embodiments where the polymer samples are provided as a polymer dissolved or dispersed in a solvent, the polymer samples may each have a fluid sample size of less than 400 mL, in other embodiments less than 100 mL, in other embodiments less than 50 mL, in other embodiments less than 30 mL, and in other embodiments less than 25 mL. In one or more embodiments, the sample size may be from about 1 mL to about 350 mL, in other embodiments from about 1 mL to about 50 mL, in other embodiments from about 10 to about 40 mL, in other embodiments from about 15 to about 25 mL.

In one or more embodiments, the plurality of polymer samples includes at least 3, in other embodiments greater than 5, in other embodiments greater than 20, and in other embodiments greater than 40 individual samples, each provided in a separate container. In these or other embodiments, the plurality of polymer includes from about 5 to about 500, in other embodiments from about 10 to about 300, and in other embodiments from about 20 to about 200 samples, each provided within a separate container.

In one or more embodiments, the step of providing a plurality of polymer samples includes transferring the individual samples of the plurality from a first container to a second container. For example, a first plurality of containers may be used to contain the polymer samples during polymer synthesis. In this example, a plurality of polymer cements resulting from polymer synthesis is contained within this first plurality of containers, and then the samples are transferred, respectively, to a second plurality of containers, which are then transferred to downstream steps of the process. Likewise, where a pre-existing polymer solution is provided, this solution may be divided into a plurality of samples that are first introduced to a first plurality of containers, and then the samples are transferred, respectively, to a second plurality of containers, which are then transferred to downstream steps of the process. Alternatively, it should be appreciated that the plurality of samples can be provided in the containers in which the polymer was synthesized or first dissolved or dispersed in solvent.

In one or more embodiments, the plurality of polymer samples are provided as an array; i.e. the samples within the plurality are arranged in an array. As with other embodiments, the array includes at least 3, in other embodiments greater than 5, in other embodiments greater than 20, and in other embodiments greater than 40 individual samples. In these or other embodiments, the array includes from about 5 to about 500, in other embodiments from about 10 to about 300, and in other embodiments from about 20 to about 200 individual samples.

For purposes of this specification, an array (e.g. an array of samples) refers to three or more samples that are separately and individually contained within a container and arranged in a predetermined, organized pattern. In one or more embodiments, the array includes rows and columns of containers that may optionally be equally spaced from each other. In other embodiments, the array may include a grouping of containers arranged around a common modal point.

In one or more embodiments, the step of providing a plurality of polymer samples employs automated machinery to handle and transfer the samples. As a result, the step of providing a plurality of polymer samples is integrated mechanically with downstream process steps. For example, automated machinery can blend polymer and solvent and deliver an array of samples to downstream processes and/or to polymer characterization steps. Additionally, in one or more embodiments, the step of providing a plurality of polymer samples is conducted with the assistance of a computer, which includes the necessary hardware, software, and memory to receive various types of data inputs and generate data outputs and/or signals to control automated features to implement the steps discussed herein.

Providing Plurality of Polymer Samples Via Polymer Synthesis

As suggested above, the plurality of polymer samples can be provided by first synthesizing a plurality of polymer samples. In one or more embodiments, the plurality of polymer samples is provided by a polymer synthesis operation, which may be referred to as a step of polymerizing monomer. For example, a plurality of solution polymerizations is conducted to prepare a plurality of polymer cement samples. In one or more embodiments, the polymerization process includes polymerizing a plurality of samples simultaneously while arranged in an array. Polymer cement refers to a composition that includes polymer dissolved or partially dissolved in a solvent. The cement may include other optional constituents such as monomer (which is unreacted from the polymerization), catalyst or initiator residues, antioxidants, oils, fillers, and quenching agents or residues thereof. In particular embodiments, the polymer cement is a polymer cement where the cement includes less than 30 wt %, in other embodiments less than 15 wt %, and in other embodiments less than 5 wt % solvent.

In one or more embodiments, the plurality of polymer cements includes individual samples that each include less than 70 wt %, in other embodiments less than 50 wt %, and in other embodiments less than 30 wt % polymer with the balance of each individual sample including solvent, monomer, catalyst or initiator residue, antioxidant, quenching agent or residue thereof.

In one or more embodiments, these polymerizations are conducted simultaneously. For example, the polymerizations may be conducted in a machine that is adapted to combine small quantities of monomer, solvent and catalyst within an automated process. Machines that are adapted to produce a plurality of polymer samples are generally known in the art as evidenced by U.S. Pat. Nos. 6,548,026, 7,807,109, 8,609,040, 9,915,591, and 8,988,677, as well as U.S. Publ. Nos. 2013/0104630, 2015/0045210, 2016/0018406, 2017/0096448, 2017/0336311, 2012/0045846, and 2016/0018406, which are incorporated herein by reference.

In one or more embodiments, the polymerization step, which may also be referred to as the polymer synthesis step, includes a synthetic method where a plurality of relatively small polymer cement samples is prepared. Generally, these processes prepare a plurality of polymer cement samples within, for example, a plurality of vials that are appropriately sized for the sample. As the skilled person appreciates, the polymer cement includes polymer at least partially dissolved in an appropriate solvent.

According to embodiments of this invention, the cement samples within the plurality each (which may be the sample size of the polymerization medium in which polymer synthesis takes place) may have a fluid sample size of less than 400 mL, in other embodiments less than 100 mL, in other embodiments less than 50 mL, in other embodiments less than 30 mL, and in other embodiments less than 25 mL. In one or more embodiments, the sample size may be from about 1 mL to about 350 mL, in other embodiments from about 5 mL to about 100 mL, in other embodiments from about 1 mL to about 50 mL, in other embodiments from about 10 to about 40 mL, in other embodiments from about 15 to about 25 mL.

The polymerizations may be conducted using a variety of polymerization techniques. For example, the polymerizations may be conducted using anionic or cationic polymerization techniques. In other embodiments, coordination catalysis may be employed.

As those skilled in the art appreciate, anionic polymerization includes processes wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce living polymers that, prior to quenching, are capable of reacting with additional monomers for further chain growth or reacting with certain functionalizing agents to give functionalized polymers.

The practice of this invention is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups.

Exemplary anionic initiators include organolithium compounds. In one or more embodiments, organolithium compounds may include heteroatoms. In these or other embodiments, organolithium compounds may include one or more heterocyclic groups.

Those skilled in the art appreciate that polymerization by coordination catalysis includes those processes wherein monomer is polymerized by using a coordination catalyst system. The key mechanistic features of coordination polymerization have been discussed in books (e.g., Kuran, W., *Principles of Coordination Polymerization*; John Wiley & Sons: New York, 2001) and review articles (e.g., Mulhaupt, R., *Macromolecular Chemistry and Physics* 2003, volume 204, pages 289-327). Coordination catalysts are believed to initiate the polymerization of monomer by a mechanism involving the coordination or complexation of monomer to an active metal center prior to the insertion of monomer into a growing polymer chain. An advantageous feature of coordination catalysts is their ability to provide stereochemical control of polymerizations and thereby produce stereoregular polymers. As is known in the art, there are numerous methods for creating coordination catalysts, but all methods eventually generate an active intermediate that is capable of coordinating with monomer and inserting monomer into a covalent bond between an active metal center and a growing polymer chain. The coordination polymerization of conjugated dienes is believed to proceed via 7-allyl complexes as intermediates. Coordination catalysts can be one-, two-, three- or multi-component systems. In one or more embodiments, a coordination catalyst may be formed by combining a heavy metal compound (e.g. a transition metal compound such as nickel, iron, or a lanthanide compound), an alkylating agent (e.g. an organoaluminum compound), and optionally other co-catalyst components (e.g. a Lewis acid or a Lewis base).

Various procedures can be used to prepare coordination catalysts. In one or more embodiments, a coordination catalyst may be formed in situ by separately adding the catalyst components to the monomer to be polymerized in either a stepwise or simultaneous manner. In other embodiments, a coordination catalyst may be preformed. That is, the catalyst components are pre-mixed outside the polymerization system either in the absence of any monomer or in the presence of a small amount of monomer. The resulting preformed catalyst composition may be aged, if desired, and then added to the monomer that is to be polymerized.

Useful coordination catalyst systems include lanthanide-based catalyst systems. These catalyst systems may advantageously produce cis-1,4-polydienes that, prior to quenching, have reactive chain ends and may be referred to as pseudo-living polymers. While other coordination catalyst systems may also be employed, lanthanide-based catalysts have been found to be particularly advantageous, and therefore, without limiting the scope of the present invention, will be discussed in greater detail.

The practice of one or more embodiments of the present invention is not limited by the selection of any particular lanthanide-based catalyst. In one or more embodiments, the catalyst composition may include a lanthanide compound, an alkylating agent, and a halogen-containing compound that includes one or more labile halogen atoms. Where the lanthanide compound and/or alkylating agent include one or more labile halogen atoms, the catalyst need not include a separate halogen-containing compound; e.g., the catalyst may simply include a halogenated lanthanide compound and an alkylating agent. In certain embodiments, the alkylating agent may include both an aluminoxane and at least one other organoaluminum compound. In yet other embodiments, a compound containing a non-coordinating anion, or a non-coordinating anion precursor, i.e., a compound that can undergo a chemical reaction to form a non-coordinating anion, may be employed in lieu of a halogen-containing compound. In one embodiment, where the alkylating agent includes an organoaluminum hydride compound, the halogen-containing compound may be a tin halide as disclosed in U.S. Pat. No. 7,008,899, which is incorporated herein by reference. In these or other embodiments, other organometallic compounds, Lewis bases, and/or catalyst modifiers may be employed in addition to the ingredients or components set forth above. For example, in one embodiment, a nickel-containing compound may be employed as a molecular weight regulator as disclosed in U.S. Pat. No. 6,699,813, which is incorporated herein by reference.

In one or more embodiments, the monomer polymerized may include conjugated diene monomer and monomer copolymerizable therewith. Conjugated diene monomer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, alpha-methylstyrene, and vinylnaphthalene.

In one or more embodiments, the polymers that are prepared may be functionalized. In one or more embodiments, functionalizing agents include compounds or reagents that can react with a reactive polymer produced by this invention and thereby provide the polymer with a functional group that is distinct from a propagating chain that has not been reacted with the co-functionalizing agent. The functional group may be reactive or interactive with other polymer chains (propagating and/or non-propagating) or with other constituents such as reinforcing fillers (e.g. carbon black and/or silica) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain.

In one or more embodiments, suitable functionalizing agents include those compounds that contain functional groups that may react with living and/or pseudo-living polymers (e.g., those produced in accordance with this invention). Exemplary functional groups include those that are reactive with silica and/or carbon black, and include alkoxysilyl, hydroxyl, polyalkylene glycol, silanol, silyl halide, anhydride, organic acid, amines, heterocycles, epoxy, ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,369,167, 6,838,526, 6,977,281, and 6,992,147; U.S. Pat. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Ser. No. 11/640,711, hydrobenzamide compounds as disclosed in U.S. Ser. No. 11/710,713, nitro compounds as disclosed in U.S. Ser. No. 11/710,845, and protected oxime compounds as disclosed in U.S. Ser. No. 60/875,484, all of which are incorporated herein by reference.

In one or more embodiments, the polymerizations may be conducted in a solvent. Useful solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed. The low-boiling hydrocarbon solvents are typically separated from the polymer upon completion of the polymerization.

In one or more embodiments, the step of synthesizing a plurality of polymer samples takes place in an array; i.e. the individual polymerization systems, each contained in a separate vessel, are arranged in an array relative to the other samples in the plurality during polymerization. The plurality can then be transferred to downstream while maintained in the array.

In one or more embodiments, the step of synthesizing a plurality of polymer samples employs automated machinery to handle and transfer the samples. As a result, the step of synthesizing a plurality of polymer samples is integrated mechanically with downstream process steps. For example, automated machinery can load monomer, solvent, and catalyst to a plurality of reaction vessels, manipulate polymerization conditions, and ultimately deliver an array of samples to downstream processes and/or to polymer characterization steps. Additionally, in one or more embodiments, the step of synthesizing a plurality of polymer samples is conducted with the assistance of a computer, which includes the necessary hardware, software, and memory to receive various types of data inputs and generate data outputs and/or signals to control automated features to implement the steps discussed herein.

As will be described in greater detail herein, it may desirable to transfer a portion of polymer produced within a polymer synthesis step to polymer analysis path 62. In one or more embodiments, the remains or extent material of the polymer sample synthesized (i.e. the portion of the polymer cement not transferred to polymer analysis path 62), is transferred to rubber formulation and characterization path 42. In one or more embodiments, the remaining portions of the samples are transferred in the same containers in which the polymerization took place. In other embodiments, different containers are employed. In one or more embodiments, remaining portion of each of the respective samples is transferred, within their respective containers, as an array. In other embodiments, the respective samples are transferred separately and individually and then placed into an array.

In one or more embodiments, the remaining portion of the polymer synthesized and not transferred polymer analysis path 62, which samples are transferred in the form of a polymer cement, may each have a fluid sample size of less than 50 mL, in other embodiments less than 30 mL, in other embodiments less than 25 mL, and in other embodiments less than 20 mL. In one or more embodiments, the sample size transferred from machine 12 to path 14 may be from about 8 mL to about 50 mL, in other embodiments from about 10 to about 30 mL, and in other embodiments from about 12 to about 20 mL.

Adding Compounding Ingredients

As suggested above, the process of the invention includes adding compounding additives, which may also be referred to as rubber formulation ingredients or rubber additives, to at least one of the samples of the plurality of rubber samples that are provided in the previous step. It will be appreciated that one or more of the samples of the plurality may not undergo additive addition (i.e. does not receive additives) as part of an experimental design. It will be appreciated that the failure to add additives, or treat every member of the plurality equally, does not depart from the practice of the invention but instead is consistent with the overall goal of screening as large and diverse number of samples as possible. As suggested above, the plurality of rubber samples may be in the form of an array.

In one or more embodiments, compounding additives may be added to the rubber samples that are provided in the plurality prior to any physical transfer of the samples. For example, where the polymer samples are synthesized, one or more additives can be added to the samples prior to the samples leaving the synthetic process or prior to the samples prepared in the process being transferred to different containers from which they were synthesized.

In one or more embodiments, the step of adding compounding additives to the plurality of polymer samples includes one or more sub-steps including, but not limited to, providing a recipe that specifies the amount of compounding additives to be added to the plurality of rubber samples or to any given sample within the plurality, measuring the quantity of the various compounding additives, and introducing the compounding additives to the individual samples of the plurality of polymer samples.

Providing a Rubber Recipe

In one or more embodiments, the optional step of providing a rubber formulation recipe may include providing a recipe that specifies the quantity of the additives relative to the amount of rubber within each sample. This step may include identifying a rubber recipe that is stored in an electronic medium (e.g. hard drive). In one or more embodiments, the recipe is provided with specific instructions for adding amounts of various compounding additives as a function of the weight of the rubber. For example, the recipe is provided in parts by weight of each additive relative to 100 parts by weight of the rubber.

These additives may include, but are not limited to, reinforcing fillers, plasticizers, and curatives. Specific examples of these ingredients include, but not limited to, carbon black, silica, fillers, oils, resins, waxes, metal carboxylates, cure agents and cure coagents. The recipe may call for introduction of all of the ingredients to the cement sample, or it may call for a first introduction of certain ingredients followed by one or more subsequent additions of one or more ingredients. The rubber sample may undergo mixing steps or one or more transfer step between the various steps of introducing ingredients (e.g. one or more ingredients may be added to a polymer cement followed by introduction of the remaining ingredients (e.g. curatives and/or cure coagents) downstream in the process, such as after mixing and/or desolventization).

In one or more embodiments, useful carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In one or more embodiments, suitable silica fillers include precipitated amorphous silica, wet silica (hydrated silicic acid), dry silica (anhydrous silicic acid), fumed silica, calcium silicate, aluminum silicate, magnesium silicate, and the like.

The rubber formulations may generally include greater than 30, in other embodiments greater than 40, and in other embodiments greater than 50 parts by weight filler per 100 parts by weight rubber. In these or other embodiments, the rubber formulations may generally include less than 200, in other embodiments less than 130, and in other embodiments less than 120 parts by weight filler per 100 parts by weight rubber. In one or more embodiments, rubber formulations may generally include from about 30 to about 200, in other embodiments from about 40 to about 130, and in other embodiments from about 50 to about 120 parts by weight filler per 100 parts by weight rubber. Carbon black and silica may be used in conjunction at a weight ratio of silica to carbon black of from about 0.1:1 to about 30:1, in other embodiments of from about 0.5 to about 20:1, and in other embodiments from about 1:1 to about 10:1.

In one or more embodiments, plasticizers include oils and solids resins. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. As is generally understood in the art, oils refer to those compounds that have a viscosity that is relatively low compared to other constituents of the vulcanizable composition, such as the resins. In one or more embodiments, the resins may be solids with a Tg of greater than about 20° C., and may include, but are not limited to, hydrocarbon resins such as cycloaliphatic resins, aliphatic resins, aromatic resins, terpene resins, and combinations thereof. Useful resins include, but are not limited to, styrene-alkylene block copolymers, thermoplastic resins such as $C_5$-based resins, $C_5$-$C_9$-based resins, $C_9$-based resins, terpene-based resins, terpene-aromatic compound-based resins, rosin-based resins, dicyclopentadiene resins, alkylphenol-based resins, and their partially hydrogenated resins.

The rubber formulations may generally include greater than 5, in other embodiments greater than 10, and in other embodiments greater than 20 parts by weight plasticizer (e.g. oils and solid resins) per 100 parts by weight rubber. In these or other embodiments, the rubber formulations may generally include less than 80, in other embodiments less than 70, and in other embodiments less than 60 parts by weight plasticizer per 100 parts by weight rubber. In one or more embodiments, rubber formulations may generally include from about 5 to about 80, in other embodiments from about 10 to about 70, and in other embodiments from about 20 to about 60 parts by weight plasticizer per 100 parts by weight rubber.

In one or more embodiments, the vulcanizable compositions of this invention include a cure system. The cure system includes a curative, which may also be referred to as a crosslinking agent, rubber curing agent or vulcanizing agents. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. In one or more embodiments, useful cure systems include sulfur or sulfur-based cross-linking agents, organic peroxide-based crosslinking agents, inorganic crosslinking agents, polyamines crosslinking agents, resin crosslinking agents, oxime-based and nitrosamine-based cross-linking agents, and the like. Examples of suitable sulfur crosslinking agents include "rubbermaker's" soluble sulfur; sulfur donating vulcanizing agents, such as an amine disulfide, polymeric polysulfide or sulfur olefin adducts; and insoluble polymeric sulfur. In other embodiments, the crosslinking agents include sulfur and/or sulfur-containing compounds. In other embodiments, the crosslinking agent excludes sulfur and/or sulfur-containing compounds. Vulcanizing agents may be used alone or in combination.

The skilled person will be able to readily select the amount of vulcanizing agents to achieve the level of desired cure. In particular embodiments, sulfur is used as the cure agent. In one or more embodiments, the rubber compositions may include greater than 0.5, in other embodiments greater than 1, and in other embodiments greater than 2 parts by weight sulfur per 100 parts by weight rubber. In these or other embodiments, the rubber formulations may generally include less than 10, in other embodiments less than 7, and in other embodiments less than 5 parts by weight sulfur per 100 parts by weight rubber. In one or more embodiments, rubber formulations may generally include from about 0.5 to about 10, in other embodiments from about 1 to about 6, and in other embodiments from about 2 to about 4 parts by weight sulfur per 100 parts by weight rubber.

Other ingredients that are typically employed in rubber compounding may also be added to the rubber compositions. These include accelerators, accelerator activators, additional plasticizers, waxes, scorch inhibiting agents, processing aids, zinc oxide, tackifying resins, reinforcing or hardening resins, fatty acids such as stearic acid, peptizers, and antidegradants such as antioxidants and antiozonants.

Measuring Additives to be Added

As the skilled person appreciates, several of the additives are solids, and therefore the step of measuring the additives includes weighing solid ingredients. On the other hand, certain of the additives may include liquids, and measuring of these liquid additives may include either weighing the liquid ingredients, or it may include measuring the volume of the liquid ingredients, which the skilled person understands may require appropriate conversions for the density of the materials in question. In particular embodiments, direct weighing may be used to measure weight. In other embodiments, weight may be measured by weighing by difference.

Once a specific recipe is derived or otherwise calculated, the appropriate amount of desired ingredients is measured according to the specific recipe. These ingredients are then combined with the rubber samples. For example, where a polymer cement is provided, the additives may be introduced to or combined with the polymer cement. In one or more embodiments, the measured additives are added or introduced with the rubber sample separately and individually, either simultaneously or sequentially. In other embodiments, the step of measuring may include pre-combining two or more of the measured ingredients into a pre-mixture, which may also be referred to as an additive concentrate. The pre-mixture may then be introduced to or combined with the polymer samples. In other embodiments, a pre-mixture or concentrate of additives is prepared and introduced to or combined with the rubber cement as one of two or more additive additions. For example, the solids may pre-combined in to a concentrate and introduced or combined with the rubber, and the liquid additives may be separately and individually introduced to or combined with the rubber in a step separate and apart from introducing or combining the solid additive premix. In one or more embodiments, the liquids can also be pre-combined in a separate premix and introduced or otherwise combined with the rubber apart from the step of introducing the solids premix. In particular embodiments, the respective ingredients of the concentrate are measured in sequence. For example, the solid ingredients are first weighed and introduced to each other, and then the liquids are subsequently measured volumetrically and introduced to the solids. Alternatively, the liquids are measured volumetrically and combined, and then the solid ingredients subsequently measured by weighing and introduced to the liquids.

Introducing Additives to Rubber Sample

In one or more embodiments, the additives are introduced, either individually or as a concentrate or partial concentrate, to the container in which the polymer samples are provided. In other embodiments, the additives are first introduced to a container, either individually or as a concentrate or partial concentrate, and then the rubber sample is introduced to that same container. In other embodiments, the rubber sample is transferred from the container in which it was provided to a separate container (e.g. a mixing vessel), and then the additives are added to this container. Within this latter embodiment, the additives can be added simultaneously with the rubber, after introduction of the rubber to the container, before introduction of the rubber, or partially before addition of the rubber and partially after addition of the rubber to the container.

In one or more embodiments, each additive or its accompanying liquid composition (e.g. carbon black and oil mixture) is separately and individually directly introduced to the respective containers containing the polymer samples or the containers to which the respective polymer samples will be added. As a result, the type and amount of additive introduced to each of the respective containers (and thereby to each of the respective samples) can be tailored per container. This includes not only tailoring the amount of additive relative to the amount of polymer, but also includes offering the ability to tailor the amount of additive relative to each of the other additives. In other embodiments, the additives, such as the solid additives, are individually weighed and then combined into a mixture (e.g. concentrate), which is then directly combined with or otherwise introduced to one or more of the respective containers containing the rubber samples or the containers to which the respective polymer samples will be added.

The manner in which the additives are introduced to rubber or introduced to the container where the additives will be combined with the rubber may vary. In one or more embodiments, one or more of the additives are introduced in the form of a liquid, which includes any composition capable of flow and having a viscosity sufficiently low enough to allow for technologically useful material flow into the container. This liquid may include a solution, a suspension, or a dispersion wherein solids are dissolved, suspended, or dispersed in an appropriate liquid. For example, the liquid containing the compounding additives may include solid additives, such as carbon black, dispersed in a low molecular weight organic solvent or in higher molecular weight materials such as oils or liquid polymers. In one or more embodiments, two or more solids ingredients, such as the reinforcing filler and the antidegradants, are combined into a liquid composition that is the combined with the rubber sample.

In one or more embodiments, the process of this invention may include a combination of separate liquid and solid additive additions to the polymer samples. For example, one or more ingredients can be introduced to the polymer samples in the form of a liquid, and one or more of the ingredients can be introduced to the polymer samples in the form of a solid. One or more of the liquids can be pre-combined prior to introducing the liquid to the polymer samples, and/or the liquids can be separately and individually introduced to the polymer samples. Likewise, one or more of the solid ingredients can be introduced to the polymer samples separately and individually, and/or the solids can be pre-combined prior to introducing the solid additives to the polymer samples.

In other embodiments, the one or more additives are introduced to or combined with the rubber in the form of a generally solid composition (e.g. a flowable particulate composition). In these embodiments, a premix or concentrate may be formed, which includes liquid additives, but due to the relative volume of solids to the liquids, this premix or concentrate is generally a solid, particulate composition that can be easily transferred as a generally flowable particulate composition. As suggested above, this generally solid, particulate concentrate can be introduced directly to a container that contains the rubber or to which the rubber will be subsequently added.

In one or more embodiments, the steps of measuring the ingredients and introducing the ingredients to the rubber samples can be combined into one step. For example, the ingredients can be measured as they are being introduced to the rubber samples. In other words, measuring can be accomplished by monitoring either weight or volume changes to the container containing the rubber samples during the introduction of the additives.

In one or more embodiments, the step of introducing or combining additives with a the rubber samples takes place while the rubber samples are within an array. In these or other embodiments, the various rubber formulation mixtures (i.e. combination of rubber and additives), which may also be referred to as rubber formulation samples, are placed into an array, which array can, among other things, assist or otherwise facilitate the automated handling and transfer of the rubber formulations to the mixing step.

As with the upstream steps in the process, the step of introducing additives to the rubber polymer may take place while the individual samples of the plurality are arranged in an array; i.e. the individual polymer samples, which are each contained in a separate vessel, are arranged in an array relative to the other samples in the plurality while being combined with the various additive. The plurality can then be transferred downstream while maintained in the array.

In one or more embodiments, the step of introducing additives to a plurality of polymer samples employs automated machinery to handle and transfer the samples. This may also include automated machinery to measure the various additives. As a result, the step of introducing additives to a plurality of polymer samples is integrated mechanically with downstream process steps. For example, automated machinery can dispense and measure the additives, combine the additives with the polymer samples, and then ultimately deliver each sample individually or as an array of samples to downstream processes and/or to compound characterization steps. Additionally, in one or more embodiments, the step of introducing additives to a plurality of polymer samples is conducted with the assistance of a computer, which includes the necessary hardware, software, and memory to receive various types of data inputs and generate data outputs and/or signals to control automated features to implement the steps discussed herein.

Mixing Rubber Formulation

Once one or more of the additives have been introduced to the plurality of rubber samples to form a plurality of rubber formulations, which may also be referred to as a plurality of rubber compounds, the rubber formulations are subjected to mixing. The step of mixing may include multiple mixing steps. In one or more embodiments, one or more of the mixing steps may be characterized as a dispersive mixing step that results in the breaking up of the minor components of the formulation (e.g. the filler particles) into smaller size particles. In these or other embodiments, one or more of the mixing step may be characterized as a distributive mixing step that results in the minor components (e.g. the filler particles) being distributed generally in a homogeneous manner throughout the formulation. In one or more embodiments, dispersive mixing takes place through high-shear or high-energy mixing. In one or more embodiments, distributive mixing takes place through low-shear or low-energy mixing.

In one or more embodiments, mixing includes a distributive mixing step followed by a dispersive mixing step. In one or more embodiments, multiple mixing apparatus or techniques may be employed for two or more of the multiple mix steps. For example, a first mix step may be performed in a first container by using a first mix technique. After this first mix step, the rubber formulation may then be transferred to a second container or vessel (e.g. a mixer) where the second mix step is performed by using a second mix technique. In conjunction with or in addition to mixing, the rubber formulation may be desolventized. For example, in particular embodiments, once the additives are combined with a polymer cement, which takes place according to the specific recipe calculated or input in preceding steps, the mixture is mixed, desolventized, and then solid-state mixed. Within this example, the steps of solution mixing (e.g. distributive mixing), desolventizing, and solid-state mixing (e.g. dispersive mixing) can take place in separate, sequential steps where the mixture can first be mixed within the presence of sufficient solvent to maintain at least a portion of the polymer dissolved in the solvent, desolventizing to remove the solvent and thereby create a solid or solvent-swollen solid composition, and then solid-state mixing in the same mixing apparatus or a transferring to a different apparatus for solid-state mixing.

According to the process of this invention, the step of mixing the rubber formulation results in the formation of a plurality of vulcanizable rubber compositions, which may also be referred to as a plurality of curable or vulcanizable rubber formulations. These compositions are then transferred to downstream process steps where the vulcanizable composition or vulcanizates prepared therefrom are analyzed.

Distributive Mixing

In one or more embodiments, distributive mixing takes place on rubber formulations having a dynamic viscosity (at 20° C.) of less than 100, in other embodiments less 50, and in other embodiments less than 20 Pa·s. In these or other embodiments, distributive mixing takes place on a rubber formulations having a dynamic viscosity (at 20° C.) of from about 1 to about 100, in other embodiments from about 2 to about 50, and in other embodiments from about 3 to about 20 Pa·s. As this skilled person will appreciate, dynamic viscosity of a rubber formulation, especially a rubber formulation that includes an appreciable amount of solvent, can be measured by using a rotational viscometer or rheometer such as those available from TA Instruments.

In one or more embodiments, the rubber formulation undergoes distributive mixing in the presence of an appreciable amount of solvent to form a generally homogeneous mixture.

In one or more embodiments, distributive mixing takes place within the container in which the polymer sample and additives are combined. This is believed to be advantageous because distributive mixing within this container serves to form a uniform rubber formulation (e.g. a homogeneous composition) such that any loss of material that might take place in subsequent transfer steps will not have material impact on the overall rubber formulation. In other embodiments, distributive mixing takes place within a separate container or vessel (e.g. mixer) from which the polymer samples are contained at the time one or more of the additives are introduced.

In one or more embodiments, distributive mixing includes, but is not limited to, the use of impeller mixing devices, rotor-stator mixing devices, ultra-sonic mixing devices, and acoustic mixing devices. In particular embodiments, distributive mixing takes place by acoustic mixing. Those skilled in the art appreciate that acoustic mixing involves use of low-frequency, high intensity acoustic energy to provide the desired mixing. Advantageously, this acoustic energy provides a uniform shear field throughout the entire mixing vessel.

In one or more embodiments, distributive mixing takes place at a temperature from about 15 to about 120° C., in other embodiments from about 18 to about 80° C., and in other embodiments from about 20 to about 50° C. In one or more embodiments, distributive mixing takes place at pressures from about 0.03 to about 1 atm, in other embodiments from about 0.07 to about 0.7 atm, and in other embodiments from about 0.1 to about 0.5 atm.

Desolventization

In one or more embodiments, desolventization may optionally take place in conjunction with one or more of the mixing steps. For example, desolventization may take place before mixing, during mixing, or in between multiple mixing steps. In one or more embodiments, dispersive mixing takes place in the substantial absence, or in other embodiments in the complete absence, of solvent; in other words, the rubber formulation is desolventized before dispersive mixing takes place or before significant dispersive mixing takes place.

In one or more embodiments, desolventization includes the removal of volatile compounds having a boiling point of less than 100° C., in other embodiments less than 90° C., and in other embodiments less than 80° C. In one or more embodiments, following desolventization, the rubber formulation includes less than 10%, in other embodiments in other embodiments less than 5%, and in other embodiments less than 1% volatile compounds.

In one or more embodiments, desolventization takes place in conjunction with distributive mixing. This may take place by conducting the mixing at elevated temperatures and/or at reduced pressures. In one or more embodiments, desolventization takes place at temperatures from about 50 to about 120° C., in other embodiments from about 60 to about 110° C., and in other embodiments from about 70 to about 100° C. In one or more embodiments, desolventization takes place at pressures from about 0.03 to about 1 atm, in other embodiments from about 0.07 to about 0.7 atm, and in other embodiments from about 0.1 to about 0.5 atm.

In particular embodiments, the rubber formulation, in the presence of sufficient solvent, is acoustically mixed and simultaneously desolventized by performing distributive mixing under the appropriate conditions of temperature and pressure. For example, in certain embodiments, the rubber formulation undergoes acoustic mixing at from about 50 to about 100° C. and pressures of from about 0.05 to about 0.5 atm.

Dispersive Mixing

As noted above, mixing includes dispersive mixing. In one or more embodiments, dispersive mixing takes place on rubber formulations having a Mooney viscosity (ML 1+4 @ 100° C.) of greater than 20, in other embodiments greater 30, and in other embodiments greater than 40 Mooney Units. In these or other embodiments, dispersive mixing takes place on a rubber formulations having a Mooney viscosity (ML 1+4 @ 100° C.) of from about 20 to about 250, in other embodiments from about 30 to about 175, and in other embodiments from about 40 to about 150 Mooney Units.

In one or more embodiments, dispersive mixing mixes a rubber formulation that includes less than 10%, in other embodiments less than 5%, and in other embodiments less than 1% volatile compounds.

In one or more embodiments, dispersive mixing takes place in a vessel (e.g. mixer) that is separate and distinct from the vessel in which distributive mixing takes place. For example, the rubber formulation is transferred from the vessel where distributive mixing takes place to a mixer where dispersive mixing takes place. In these or other embodiments, distributive and dispersive mixing takes place in the same vessel (i.e. both mixing steps take place within the same mixer). In one or more embodiments, distributive mixing takes place in a first vessel, and then additional distributive mixing takes place in a second vessel, followed by dispersive mixing taking place in the second vessel (i.e. same vessel where the second distributive mixing step took place).

In one or more embodiments, dispersive mixing may be the only mixing step performed on the rubber formulation. In other embodiments, dispersive mixing is at least the second of multiple mixing steps performed on the rubber formulation. In particular embodiments, dispersive mixing is followed by a distributive mixing step. In these or other embodiments, dispersive mixing is conducted after desolventization of the rubber formulation. In one or more embodiments, the mixing device is adapted to solution mix while the solution masterbatch contains sufficient solvent to maintain the polymer in solution, and then to solid-state mix the polymer and additives once the level of solvent has been reduced to produce a solid or solvent-swollen polymer.

In one or more embodiments, high-shear mixing is accomplished by using an internal mixer, a mill (e.g. two roll mill), a melt mixer, a reaction extruder (e.g. twin-screw extruder or planetary extruder), or a gear pump-type mixer.

In one or more embodiments, dispersive mixing takes place at a temperature from about 50 to about 280° C., in other embodiments from 80 to about 280° C., in other embodiments from about 100 to about 280° C., in other embodiments from about 150 to about 270° C., and in other embodiments from about 180 to about 260° C. In one or more embodiments, distributive mixing takes place at pressures from about 0.03 to about 1 atm, in other embodiments from about 0.07 to about 0.7 atm, and in other embodiments from about 0.1 to about 0.5 atm.

In one or more embodiments, the process includes a sequential, tandem and/or intermeshed series of mixing and additive addition steps. For example, in one or more embodiments, a first mixture of rubber polymer and additives (e.g. particulate filler), excluding rubber curatives or coagents, is prepared and subjected to dispersive mixing (to make a non-productive formulation or masterbatch). Following this dispersive mixing, rubber curing agents (as well as coagents and the like) are introduced to the composition that underwent dispersive mixing, and then a subsequent mixing step (i.e. productive mixing) is performed on the composition to which the curative is added. Within this example, mixing in the presence of the curative takes place at conditions that are different than the initial dispersive mixing step. For example, the initial dispersive mixing step may take place at higher temperatures and under higher mechanical energy than mixing in the presence of the curative, where mixing conditions are maintained to inhibit curing of the rubber formulation during mixing.

In particular embodiments, two mixers are placed in series. Within these embodiments, the first mixer in series is adapted to desolventize the solvent-laden composition and impart high shear mixing at a high temperature (e.g. about 160° C.). In one or more embodiments, the composition being mixed is devoid or substantially devoid of a curative. The resulting curative-free, desolventized composition is then transferred to second mixer. During transfer or within second mixer, a curative package is introduced to the composition to form a vulcanizable mixture. Second mixer is adapted to impart relatively low temperature (e.g. below about 110° C.) to the vulcanizable composition while distributing and/or dispersing the curative. As the skilled person will appreciate, these conditions will ensure that the curing process is not started prematurely.

In other embodiments, one or more masterbatch composition (i.e. mixtures) of additives are prepared and introduced and mixed with rubber polymer in conjunction with or in sequence with other additives that may be added to the rubber polymer individually or as a separate and distinct mixture of additives. This method may be intertwined with processes that include multiple mixing steps wherein sequential, tandem and/or intermeshed additive additions and mixing steps are employed. For example, in one or more embodiments, a solid additive, such as carbon black, is introduced to a rubber polymer and the mixture undergoes dispersive mixing. In a parallel process, various other ingredients, such as oils, waxes, cure adjuvants, and the like are mixed to form an additive mixture. This additive mixture can then be combined with the composition of carbon black and polymer that underwent dispersive mixing and then further subjected to further dispersive mixing.

As with the other steps of the process, the step of mixing the plurality of polymer samples takes place while the samples are maintained in an array; i.e. the individual formulations, each contained in a separate vessel, are arranged in an array relative to the other samples in the plurality during mixing. The plurality can then be transferred to downstream processes while maintained in the array.

In one or more embodiments, the step of mixing a plurality of polymer samples employs automated machinery to handle and transfer the samples. As a result, the step of mixing a plurality of polymer samples is integrated mechanically with downstream process steps. For example, automated machinery can handle each sample, insert appropriate mix equipment into the sample and/or transfer the samples to mixing devices, and ultimately deliver an array of samples to downstream processes and/or to polymer characterization steps. Additionally, in one or more embodiments, the step of mixing a plurality of polymer samples is conducted with the assistance of a computer, which includes the necessary hardware, software, and memory to receive various types of data inputs and generate data outputs and/or signals to control automated features to implement the steps discussed herein.

Rubber Characterization

According to embodiments of the present invention, the plurality of vulcanizable compositions prepared by the foregoing mixing steps is transferred collectively or individually to a rubber formulation characterization step. In one or more embodiments, the vulcanizable compositions are formed into an appropriate shape, cured, and then characterized. In one or more embodiments, characterization of the rubber takes place during curing. For example, Mooney viscosity and cure characteristics can be analyzed during cure using rheometric equipment. In other embodiments, the vulcanizable composition is first cured and then later characterized; this technique being typical where analysis focuses on mechanical or dynamic properties.

In one or more embodiments, a plurality of mixed rubber samples is transferred, either manually or automatically, from the mixing step to a forming machine, which is adapted to shape the vulcanizable compositions of the plurality into a plurality of samples having an appropriate shape for subsequent sample preparation or for direct evaluation. In one or more embodiments, the plurality of rubber samples is transferred to a rubber cure analyzer such as a rubber process analyzer (RPA) and/or a moving die rheometer (MDR) or similar test device that cures the respective samples of the plurality and analyzes the samples during the curing process. As will be appreciated by those skilled in the art, the analyzer can gradually cure the shaped sample and tests the sample at various time intervals. In one or more embodiments, the analyzer transfers data collected during the testing and analysis to a database.

In other embodiments, the plurality of formed vulcanizable rubber samples is transferred from the forming machine to a curing press that is adapted to cure the sample. The plurality of cured samples may then be transferred to one or more analytical steps that perform testing on the plurality of rubber vulcanizates. As the skilled person will appreciate, the cured sample can be analyzed for various properties including, but not limited to, mechanical and dynamic properties. The equipment employed in analyzing the cured rubber samples can transfer test result to a database. In yet other embodiments, the cured rubber formed in the rubber cure analyzer, which may include a cured button, is transferred for mechanical or other analysis in subsequent testing steps. In one or more embodiments, this step includes manipulation of the cured sample for subsequent testing. This manipulation may include cutting, stamping or machining the cured sample.

As with the upstream steps in the process, the step of rubber characterization may take place while the individual samples of the plurality are arranged in an array; i.e. the individual vulcanizable rubber samples or cured rubber samples, which are each contained in a separate vessel, are arranged in an array relative to the other samples in the plurality during while the being combined with the various additive. The plurality can then be transferred to downstream while maintained in the array.

In one or more embodiments, the step of characterizing the rubber samples employs automated machinery to handle and transfer the samples. This may also include automated machinery to prepare test samples, feed the test samples to the testing equipment, and remove the remaining sample from the testing equipment. As a result, the step of characterizing the rubber samples is integrated mechanically with upstream and/or downstream process steps. Additionally, in one or more embodiments, the step of characterizing the rubber samples is conducted with the assistance of a computer, which includes the necessary hardware, software, and memory to receive various types of data inputs and generate data outputs and/or signals to control automated features to implement the steps discussed herein.

Polymer Characterization Path

As indicated above, a polymer sample, or a portion thereof, may be provided to a polymer characterization path 62, which may also be referred to as polymer analysis path 62. Although not a prerequisite, polymer characterization path may be desirable when the step of providing a polymer includes synthesizing the polymer. In this situation, once a polymer cement has been prepared (which may include a plurality of polymer samples), a subsample of the cement is obtained from the cement and analytical procedures are conducted on the sample. In one or more embodiments, polymer characterization may determine, for example, the amount of polymer remaining the cement sample.

Embodiments of the invention can be described with reference to FIG. 2. Polymer analysis path 62 may include obtaining an analysis sample from the polymer cement provided in step 40 within step 64 of extracting subsamples. In other words, the analysis sample may be a portion of the polymer provided in step 40. This analysis sample, which may also be referred to as a subsample, may be in the form of a polymer cement having a fluid sample size of less than 15 mL, in other embodiments less than 10 mL, in other embodiments less than 7 mL, in other embodiments less than 5 mL, in other embodiments less than 3 mL, and in other embodiments less than 2 mL. In one or more embodiments, the sample size may be from about 0.5 mL to about 10 mL, in other embodiments from about 0.7 to about 5 mL, in other embodiments from about 1 to about 3 mL, in other embodiments from about 0.5 to about 5 mL, in other embodiments from about 1 to about 4 mL, or in other embodiments from about 1.5 to about 3 mL.

In one or more embodiments, the steps of extracting subsamples, dividing subsamples, and preparing samples for analysis may take place by using automated handling equipment. These machines may be adapted to transfer materials from one to container to another. One or more of these steps may include tagging and/or identifying the various samples. For example, a portion of a subsample (i.e. an aliquot of a subsample) is removed from its respective container and transferred to another container. This aliquot may be referred to as micro-subsamples. As used herein, micro-subsample is used to designate the fact that the sample is a sample or portion of a subsample and the term is not used to necessarily designate or give indication to the volume of the sample. Databases and processing units can be used to further correlate each micro-subsample with the subsample and primary sample from which it derives.

Machine may be adapted to transfer micro-subsamples to sample preparation machine, which is adapted to prepare samples for analytical testing. For example, machine may be adapted to desolventize or otherwise perform a solvent swap to place the polymer, which was originally dissolved in a first solvent, into a second solvent that may be more conducive for performing specific downstream analytical testing. In any event, machine is adapted to further prepare the micro-subsamples as needed depending upon the additional tests that are to be performed. In view of this specification, the skilled person appreciates that certain functions may be implemented by any combination of the machines. In any event, either separately or in some combination thereof, each micro-subsample may be tagged with an appropriate identification (e.g. bar code or other type of identification tag) for accurate processing and documentation of the micro-subsamples. In one or more embodiments, step 68 of preparing samples for analysis may include desolventization or solvent substitution prior to analysis.

The samples are then analyzed in step 70 of analyzing samples, which may also be referred to as analysis step 70, and data relative to the polymer samples and/or analysis is collected and transferred to a storage medium, such as database, in said step of transferring data. As will be described in greater detail below, information relative to the polymer sample may be shared between rubber formulation and characterization path 42 and polymer analysis path 62 in step 80 of sharing information.

In one or more embodiments, analytic testers may perform a variety of polymer tests to determine one or more characteristics of the polymer. For example, the test may include gel permeation chromatography (GPC); infrared spectroscopy such as Fourier-transform Infrared spectroscopy (FTIR); gas chromatography (GC); and a nuclear magnetic resonance (NMR).

In one or more embodiments, the step of analyzing the polymer generates data and information that can be collected and transferred to a database. Skilled artisans will appreciate that computer databases and processing units can be used for this purpose which may include data collection, assimilation, and integration.

As with previous steps, the manipulation and handling of the samples or subsamples or microsamples to and from the various testing or analytical machines can take place by employing automated handling equipment. Also, a plurality of samples, subsamples and microsamples can be placed into an array, which array can, among other things, assist or otherwise facilitate the automated handling and transfer of the samples, subsamples and microsamples.

In one or more embodiments, analysis step 70 includes determining the percent conversion of step 40 when polymer is synthesized. In one or more embodiments, the percent polymer conversion can be determined by using known techniques, which may take advantage of various analytical pieces of equipment such as, but not limited to, a gel permeation chromatography (GPC); a Fourier-transform infrared spectroscopy (FTIR), and gas chromatography. In one or more embodiments, polymer analysis step 70 also provides, either directly or indirectly, the amount of polymer remaining within the polymer cement sample prepared in step 40. As the skilled person appreciates, determining the amount of polymer with the remaining sample from step 40 may include one or more calculations that may require further data such as the volume of the remaining polymer cement sample and the volume of the subsample extracted from the primary sample for use in the analysis step.

Process Integration

In one or more embodiments, the present invention provides a method by which the quantity of the respective additives introduced to the rubber cement is calculated or derived based upon the quantity of rubber within the cement. As suggested above, the quantity of rubber within the cement can be determined by analytical techniques. With this information, algorithms can be employed to correlate the quantity of rubber within the cement to a desired rubber recipe to provide a specific recipe for the polymer cement in question. This information is then communicated to automated machinery that weighs the appropriate amount of the respective ingredients and introduces the weighed ingredients to the cement. The cement can then be subsequently desolventized and mixed under solid-state, high-shear conditions to form a vulcanizable composition that is subsequently cured and characterized.

As described above, polymer can be provided by step 40, and additives are introduced with the rubber in step 42. In certain embodiments, polymer proved in step 40 may result from a step of synthesizing polymer to form a polymer cement. Following synthesis step, a subsample of the polymer cement is extracted and analyzed in path 62, where the amount of polymer within the cement can be determined. In one or more embodiments, the process of the invention includes providing a specific recipe for each polymer cement sample in question. Within this step, the amount of polymer remaining within the cement sample (following extraction for analysis) is determined and correlated to the generic recipe provided. This step is facilitated by a data transfer step whereby information relative to the polymer subsample is transferred to or otherwise communicated to a processing unit that calculates the specific recipe based upon algorithms stored within a data storage unit. For example, a generic rubber compound recipe including a plurality of ingredients to be combined with rubber, where the recipe quantifies the amount of each ingredient as a function of the total weight of rubber within the recipe, is provided or identified as a sub-step of step 44 of adding compounding additives. A specific recipe for any given polymer cement is then prepared by correlating the amount of polymer within the polymer cement sample (from information obtained in analysis path 62) to the generic rubber compound recipe provided in step 44. In other words, preparation of a specific recipe requires a data transfer (e.g. information transfer step 80 shown in FIG. 2) from analysis path 62. From this specific recipe, the ingredients identified in the specific recipe are weighed and introduced to the polymer cement in step 44 as described above. As further explained above, the mixture that is formed, wherein at least a portion of the polymer remains dissolved in solvent, is then mixed in a mixing step 46. In conjunction with or subsequent to mixing 46, the mixture may be desolventized and then subsequently mixed in the solid state as described above. The resulting vulcanizable composition can then formed and cured into a vulcanizate as described above. As also described above, characterization of the vulcanizable composition and vulcanizate can take place in conjunction with or subsequent to the curing.

Overall System

As indicated above, aspects of the invention include a unique system for carrying out one or more of the processes described herein. A system according to embodiments of the invention can be described with reference to FIG. 3, which shows system 100. System 100 optionally includes a polymer synthesis machine 120 from which polymer characterization system path 140 extends. Also, a rubber formulation and characterization system path 160 extends from optional polymer synthesis machine 120 in a tandem or parallel fashion.

In one or more embodiments, machine 120 includes various types of sensors, control functions, and appropriate monitoring equipment to formulate the desired samples, as well as mechanisms for tagging or otherwise identifying each sample. For example, machine 120 may be adapted to bar code each sample.

In one or more embodiments, the plurality of polymer samples are placed or otherwise arranged into an array. In other words, an array of polymer cement samples is formed. By placing the polymer cements into an array, mechanical integration between polymer synthesis machine 120 and polymer characterization system path 140 and/or rubber formulation and characterization system path 160 is facilitated.

In one or more embodiments, polymer characterization path 140, which may simply be referred to as path 140, includes polymer handling and transfer machine 200, which may be in mechanical integration with machine 120 and sample preparation machine 220. Sample preparation machine 220 is adapted to prepare polymer samples for characterization by one or more analytical tools 240. In one or more embodiments, sample preparation machine 220 is in mechanical integration with one or more analytical tools 240. As the skilled person appreciates, mechanical integration includes the use of automated machinery (e.g. robotics) to perform the desired task and/or automatically transfer polymer samples to the next sub-component of the overall system. In some embodiments, manual transfer of the polymer samples may be used.

In one or more embodiments, polymer handling and transfer machine 200 is adapted to obtain or otherwise receive a portion of each of the respective samples from machine 120. In other words, a portion of the respective individual polymer cement samples produced by machine 120, which portion may be referred to as an aliquot or subsample, is removed from its respective container and transferred to another container.

In one or more embodiments, machine 200 is adapted to tag the subsamples and further separate or subdivide the samples. For example, a portion of a subsample (i.e. an aliquot of a subsample) is removed from its respective container and transferred to another container. This aliquot may be referred to as micro-subsamples, which may be designated generally by the numeral 210. As used herein, micro-subsample is used to designate the fact that the sample is a sample or portion of a subsample from machine 120 and the term is not used to necessarily designate or give indication to the volume of the sample. Machine 200 may be further adapted to tag each micro-subsample for subsequent identification in downstream subcomponents of the system. Databases and processing units can be used to further correlate each micro-subsample with the subsample and primary sample from which it derives.

Machine 200 may be adapted to transfer micro-subsamples to sample preparation machine 220, which is adapted to prepare samples for analytical testing. For example, machine 220 may be adapted to desolventize or otherwise perform a solvent exchange to place the polymer, which was originally dissolved in a first solvent, into a second solvent that may be more conducive for performing specific downstream analytical testing. In any event, machine 220 is adapted to further prepare the micro-subsamples as needed depending upon the additional tests that are to be performed. In view of this specification, the skilled person appreciates that certain functions may be implemented by any combination of the machines. In any event, either separately or in some combination thereof, each micro-subsample may be tagged with an appropriate identification (e.g. bar code or other type of identification tag) for accurate processing and documentation of the micro-subsamples.

In one or more embodiments, analytic testers 240 receive or otherwise obtain from machine 220, or any configuration of machines 120, 200, or 220, one or more micro-subsamples 210. The analytic tester 240 may include a variety of polymer testing apparatus, either alone or in combination therewith, which are adapted to determine one or more characteristics of the polymer. For example, apparatus 240 may include gel permeation chromatography (GPC) 260; infrared testers such as Fourier-transform Infrared spectroscopy (FTIR) 280; gas chromatographs (GC) 300; and a nuclear magnetic resonance (NMR) 320.

These testing devices 240 generate data and information that can be collected and transferred as designated generally by the numeral 360. This data is transferred to a database (shown as DB in FIG. 3) designated generally by the numeral 400. Skilled artisans will appreciate that a computer 420 may be connected to the database 400 so as to further analyze the data collected and to provide for association of the identification tags with the data generated for further evaluation.

In one or more embodiments, rubber formulation and characterization system path 160, which may simply be referred to as path 160, includes a rubber formulation machine 490, which may include sample transfer machine 500 and additive weighing machine 520. As will be appreciated from this specification, these components of the system can be integrated into one subcomponent. In one or more embodiments, rubber formulation machine(s) 500, 520 may be in mechanical integration with polymer synthesis machine 120.

Figure 3:
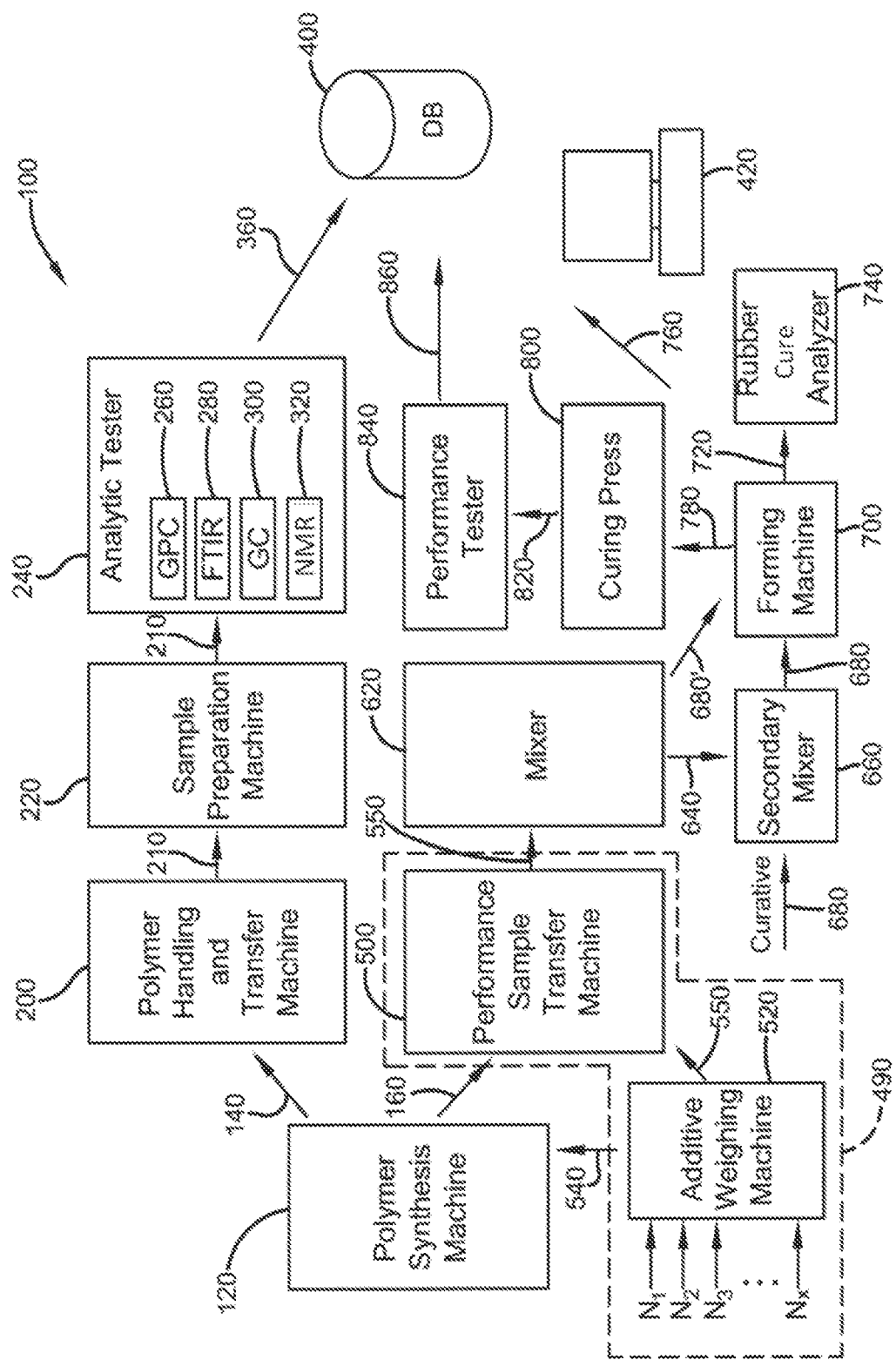
FIG. 3 is a schematic diagram of a system and method for polymer isolation and mixing of one or more embodiments of the present invention.

As suggested above, samples are received (in the form of a polymer cement) by rubber formulation machine 490, which may include sample transfer subcomponent 500 and an additive weighing machine 520. Regardless of the subcomponents, the purpose of machine 490 is to introduce compound additives to the polymer samples, which are subsequently subjected to high shear mixing, resulting in rubber compounds, which may also be referred to as rubber compositions or rubber formulations or, in certain embodiments vulcanizable compositions. For example, machine 490 is adapted to introduce rubber compounding additives to the polymer cement. As shown in FIG. 3, this can be accomplished with multiple machines (e.g. machines 500 and 520), although the skilled person, in view of the present specification, can adapt the system to include a single machine.

In one or more embodiments, machine 490 is adapted to introduce multiple rubber compounding ingredients to the samples transferred to step 160. In one or more embodiments, these compounding ingredients, which may also be referred to as additives, may include, but are not limited to, carbon black, silica, waxes, oils, fillers, curatives, and the like. With reference to FIG. 3, these additives are generically represented as $N_1$, $N_2$, $N_3$, . . . and $N_x$, where $x$ can be any number. The amount of each additive can be preselected or may be based on any characteristic determined from the micro-subsamples processed through path 140.

Regardless of the subcomponents or methodology employed to combine the respective polymer cement samples with the desired type and amount of additives, the combination of the additives and cement forms a composition 550, which may be referred to as rubber mixture 550. Where curative is added to rubber mixture 550, a vulcanizable composition is formed.

Downstream of rubber formulation machines 500,520 is mixing machine 620 and optional secondary mixer 660, which is downstream of mixer 620. As with the other subcomponents, mixing machine 620 may be in mechanical integration with formulation machines 500,520, and mixer 660 may be in both fluid and mechanical integration with secondary mixer 660.

Mixture 550 can then be transferred to mixer 620. According to embodiments of the invention, mixer 620 is adapted to desolventize the solution masterbatch and impart sufficient energy (e.g. in the form of shear and heat) to disperse the additives into the rubber. In one or more embodiments, mixer 620 is adapted to solution mix while the mixture of cement and additives contains sufficient solvent to maintain the polymer in solution, and then to solid-state mix the polymer and additives once the level of solvent has been reduced to produce a solid or solvent-swollen polymer.

In one or more embodiments, mixer 620 may include an ultrasonic mixer, a mill, an internal mixer, a melt mixer, a reaction extruder (e.g. twin-screw extruder or planetary extruder), or a gem pump-type mixer. Useful mixing devices are known in the art as exemplified in U.S. Pat. Nos. 4,695,240, 6,260,407, 6,881,363, 8,794,819, and U.S. Publication Nos. 2008/0113059, 2008/0174045, 2015/0158228, and 2019/0055383, which are incorporated herein by reference.

Downstream of mixers 620,660 is forming machine 700, which feeds either curing press 800 or rubber cure analyzer 740. Downstream of cure analyzer 740 or curing press 800 may be one or more cured rubber performance testing machines. In one or more embodiments, forming machine 700 is in mechanical integration and fluid communication with mixers 600,660 as well as downstream subcomponents such as cure analyzer 740 and curing press 800.

Upon completion of the mixing, either by the mixer 620 or by the combination of first mixer 620 and second mixer 660, the mixed sample is transferred either manually or automatically at step 680 or 680' to a forming machine 700. Forming machine 700 is adapted to shape the mixed sample into a formed sample 720 having an appropriate shape for subsequent sample preparation or for direct evaluation.

In one or more embodiments, formed sample 720 is transferred to a rubber cure analyzer such as a rubber process analyzer (RPA) and/or a moving die rheometer (MDR) or similar test device that cures the sample during testing. As will be appreciated by those skilled in the art, the analyzer 740 gradually cures the shaped sample and tests the sample at various time intervals. The analyzer 740, which may be considered a performance test device, then transfers the collected data at step 760 to the database 400.

In other embodiments, a formed sample 780 is transferred from the forming machine 700 to a curing press 800 that is adapted to cure the sample, which may then be transferred to a performance tester 840, which may also be considered a performance test device. As the skilled person will appreciate, the cured sample can be analyzed for various properties including, but not limited to, mechanical and dynamic properties. Performance tester 840 generates performance data 860, which can be transferred to the database 400 whereupon it is associated with the other identified samples so that the groups of samples processed through the structure path 140 and the performance path 160 can be compared to one another for further evaluation to determine if a particular sample has promising characteristics that warrant further evaluation.

In yet other embodiments, the cured rubber formed in the rubber cure analyzer, which may include a cured button, is transferred for mechanical or other analysis (e.g. performance tester 840). In one or more embodiments, this step includes manipulation of the cured sample for subsequent testing. This manipulation may include cutting, stamping or machining.

In one or more embodiments, each of the subcomponents may individually be in communication with a database 400 and/or data processing unit 420. Also, in one or more embodiments, each of the subcomponents may be in direct communication with another subcomponent to thereby provide or share information or data relative to two or more subcomponents of the system.

According to embodiments of the present invention, two or more of the components of system 100 are integrated mechanically with each other. Likewise, two or more of the components may be integrated to for the exchange of information between the components. The skilled person will appreciate the meaning of mechanical integration and the benefits thereof, as well as the manner and benefit of the components being in communication with each other for the exchange of information. For example, this may include use of robotics and computer automation to move materials from component to component, to activate movement of material, and activate the process step being accomplished at the component. Likewise, two or more of the components may be integrated to for the exchange of information between the components. Still further, two or more of the component may be in communication with a central processing unit.

Various modifications and alterations that do not depart from the scope and spirit of this invention will become apparent to those skilled in the art. This invention is not to be duly limited to the illustrative embodiments set forth herein.

What is claimed is:

1. A method for preparing and characterizing an array of rubber formulations, the method comprising:
   (i) providing at least three rubber cement samples, where each rubber cement sample of the at least three rubber cement samples is contained within a corresponding at least three containers, where the at least three containers are arranged in an array, where each rubber cement sample includes from about 0.5 to about 120 grams of rubber dissolved or dispersed within a solvent, and the volume of each rubber cement sample is from about 1 to about 50 mL;
   (ii) introducing a compounding additive to the at least three rubber cement samples to thereby form at least three rubber cement formulations, where each rubber cement formulation of the at least three rubber cement formulations is contained within the corresponding at least three containers, and where the at least three containers are arranged in an array;
   (iii) solution mixing the at least three rubber cement formulations to thereby form at least three mixed rubber cement formulations, where each mixed rubber cement formulation of the at least three rubber cement formulations is contained within the corresponding at least three containers, and where the at least three containers are arranged in an array;

(iv) desolventizing the at least three rubber cement formulations to thereby form at least three desolventized rubber formulations, where each desolventized rubber formulation of the at least three desolventized rubber formulations is contained within the corresponding at least three containers, and where the at least three containers are arranged in an array; and (v) analyzing the at least three desolventized rubber formulations.

2. The method of claim 1, where each rubber cement sample includes from about 0.5 to about 30 grams of rubber dissolved or dispersed within a solvent, and the volume of each rubber cement sample is from about 10 to about 40 mL.

3. The method of claim 1, where said step of providing provides from about 5 to about 500 rubber cement samples.

4. The method of claim 1, where said rubber cement samples include polymer selected from the group consisting of polybutadiene, poly (styrene-co-butadiene), polyisoprene, poly (styrene-co-isoprene), and functionalized derivatives thereof.

5. The method of claim 1, where said step of introducing a compounding additive includes providing a rubber recipe and measuring a desired quantity of the compounding additive based upon the rubber recipe.

6. The method of claim 5, where said step of introducing a compounding additive introduces an additive selected from the group consisting of reinforcing fillers, plasticizers, and curatives.

7. The method of claim 1, where said step of introducing a compounding additive includes combining two or more compounding additives to form a concentrate, and then adding the concentrate to the at least three rubber cement samples.

8. The method of claim 1, further comprising introducing a curative to the at least three desolventized rubber formulations to thereby form at least three desolventized vulcanizable compositions, where each desolventized vulcanizable composition is contained within the corresponding at least three containers, and where the at least three containers are maintained within an array.

9. The method of claim 7, where the two or more compounding additives are selected from the group consisting of reinforcing fillers, plasticizers, and curatives.

10. The method of claim 1, where the rubber cement is prepared by polymerizing conjugated diene monomer and optionally monomer copolymerizable therewith with a hydrocarbon solvent.

11. The method of claim 1, where said step of introducing a compound additive includes introducing a solid additive dispersed in a low molecular weight organic solvent, an oil or a liquid polymer.

12. The method of claim 11, where the solid additive is at least one of carbon black and silica.

13. A method for formulating a plurality of rubber formulations and characterizing, the method comprising:

(i) providing a plurality of rubber cement samples, where the plurality of rubber cement samples are contained within a plurality of respective containers, and where the plurality of respective containers are arranged in an array, where each of the rubber cement samples of the plurality of rubber cement samples includes from about 0.5 to about 120 gram of rubber dispersed or dissolved within a cement having a volume of less than 400 mL;

(ii) introducing a compounding additive to each of the rubber cement samples of the plurality of rubber cement samples while each rubber cement sample is contained within the plurality of the respective containers to thereby form a plurality of rubber cement formulations, where each rubber cement formulation of the plurality of rubber cement formulations is contained within the plurality of respective containers, and where the plurality of respective containers are arranged in the array;

(iii) solution mixing each of the rubber cement formulations of the array of rubber cement formulations while each rubber cement formulation is contained within the plurality of respective containers to thereby form a plurality of mixed rubber cement formulations, where each mixed rubber cement formulation of the plurality of mixed rubber cement formulations is contained with the plurality of respective containers, and where the plurality of respective containers are arranged in the array;

(iv) desolventizing each mixed rubber cement formulation of the of the plurality of mixed rubber cement formulations thereby form a plurality of desolventized rubber formulations, where each desolventized rubber formulation of the plurality of desolventized rubber formulations is contained within the plurality of respective containers, and where the plurality of respective containers are arranged in the array; and (v) analyzing each desolventized rubber formulation of the plurality of desolventized rubber formulations to thereby characterize the each desolventized rubber formulation of the plurality of desolventized rubber formulations.

* * * * *